US005335132A

United States Patent [19]

DeShazo, Jr.

[11] Patent Number: 5,335,132
[45] Date of Patent: Aug. 2, 1994

[54] OVERVOLTAGE SENSOR WITH HYSTERESIS

[75] Inventor: Thomas R. DeShazo, Jr., Frenchtown, N.J.

[73] Assignee: Harris Corporation, Melbourne, Fla.

[21] Appl. No.: 716,488

[22] Filed: Jun. 17, 1991

[51] Int. Cl.[5] .............................................. H02H 3/20
[52] U.S. Cl. ........................................ 361/18; 361/56; 361/91; 323/281
[58] Field of Search ........................ 361/18, 91, 92, 87, 361/56; 330/207 P, 361; 307/250; 323/226, 281, 303

[56] References Cited

U.S. PATENT DOCUMENTS

| | | | |
|---|---|---|---|
| 3,585,453 | 6/1971 | Kawai | 361/18 |
| 4,186,418 | 1/1980 | Seiler | 361/91 |
| 4,868,703 | 9/1989 | Borkowicz | 361/58 |
| 4,901,184 | 2/1990 | Ishii et al. | 361/91 |

FOREIGN PATENT DOCUMENTS

| | | | |
|---|---|---|---|
| 0166581 | 1/1986 | European Pat. Off. | H02H 9/04 |
| 0404220 | 12/1990 | European Pat. Off. | H02H 9/04 |

*Primary Examiner*—A. D. Pellinen
*Assistant Examiner*—S. Jackson
*Attorney, Agent, or Firm*—Charles Krawczyk; Henry Schanzer; Charles Wands

[57] ABSTRACT

First and second resistors are connected in series with a Zener diode between first and second points of operating potential. The base-to-emitter of an NPN transistor is connected across the first resistor to sense the current through the series path. The collector-to-emitter of a PNP transistor is connected across the second transistor, whereby when the PNP transistor is turned-on hard and into saturation, the voltage drop across the second transistor decreases. The collector of the NPN transistor is connected to the base of the PNP transistor, whereby when an overvoltage condition exists and the Zener diode breaks down, the two transistors are driven regeneratively and form a latch and the operating point of the circuit is shifted.

18 Claims, 2 Drawing Sheets

OVERVOLTAGE SENSOR WITH HYSTERESIS

BACKGROUND OF THE INVENTION

This invention relates to circuitry for sensing when the operating voltage applied to the circuitry exceeds a predetermined level and for producing a control signal in response to an overvoltage condition.

In many applications, such as, for example, automotive systems, the supply voltage may vary over a wide range. Circuits powered by the supply voltage may be damaged when the supply voltage exceeds a certain overvoltage level (VOV). To prevent the circuits from being damaged, the overvoltage condition must be sensed and power must be removed from the circuits or the circuits must be deactivated.

A known circuit for sensing an overvoltage condition is shown in FIG. 1. The circuit of FIG. 1 includes a PNP transistor, Q1, connected as a diode which is used to prevent current flow between the positive supply line (Vs) and ground when the supply and ground connections are interchanged. A Zener diode, Z1, used to sense the overvoltage condition is connected in series with Q1 and resistors R1 and R2 between Vs and ground. Resistor R1 is used to limit the current which flows through Q1 and Z1 and the value of resistor R2 is selected to ensure the voltage across R2 will be less than 0.5 or 0.6 volts when Z1 is not conducting. An NPN transistor, Q2, whose base-to-emitter junction is connected across R2, is used to control the load circuitry 7 when Z1 breaks down and causes Q2 to conduct.

The operation of the circuit of FIG. 1 may be briefly described as follows:

Assume that Z1 has a breakdown voltage Vz and that Q1 has a forward voltage of Vf. For values of supply voltage (Vs) less than Vz+Vf, there is only leakage current flowing through Q1, Z1, R1 and R2. When Vs exceeds Vz+Vf, a current, Ix, flows through Q1, Z1, R1 and R2. VOV is the value of Vs at which Vs exceeds Vz+Vf and produces a current Ix which causes Q2 to conduct. Transistor Q2 conducts when a voltage drop equal to VBE2 is developed between its base and emitter terminals. The VBE2 drop is produced when the current Ix flowing through Q1, Z1, R1 and R2 reaches a level such that [Ix·R2] exceeds the VBE of Q2. For values of Vs much less than VOV, the current through Z1 is small (leakage) generating a voltage much less than VBE2 across R2. As Vs increases and approaches VOV, Z1 breaks down and the current through Z1 increases causing the voltage across R2 to rise. When Vs equals VOV, the voltage developed across R2 equals VBE2, current flows into the base of Q2 and the collector current of Q2 is sufficient to turn off (or otherwise deactivate) the load circuitry 7 connected to the collector of Q2.

The circuit of FIG. 1 performs a useful function but suffers from the following disadvantages: 1. When Vs rises to a voltage level where the Zener diode, Z1, just begins to conduct, noise signals may be generated which cause the collector current of Q2 to vary widely. This results in an oscillatory signal being applied to control the load circuitry 7 connected to the collector of Q2. 2. The voltage developed across R2 and the resulting conduction level of Q2 changes as the supply voltage is varied in the vicinity of VOV. If Vs changes gradually, the load circuitry 7 connected to the collector of Q4 will be turned off or on gradually over a range of several millivolts. In this range, noise signals can cause erratic operation of the circuit under control.

These disadvantages are significantly reduced, if not eliminated, in circuits embodying the invention.

SUMMARY OF THE INVENTION

Overvoltage sensing circuits embodying the invention include positive feedback means for causing the overvoltage sensing circuit to go into a latch condition and produce a definite overvoltage indication upon the occurrence of an overvoltage condition. Circuits embodying the invention also include hysteresis for causing the circuit to latch up for one value of supply voltage and to drop out of the latch condition for another value of supply voltage.

BRIEF DESCRIPTION OF THE DRAWING

In the accompanying drawing, like reference characterisitics denote like components.

DETAILED DESCRIPTION OF THE INVENTION

Figure 1:
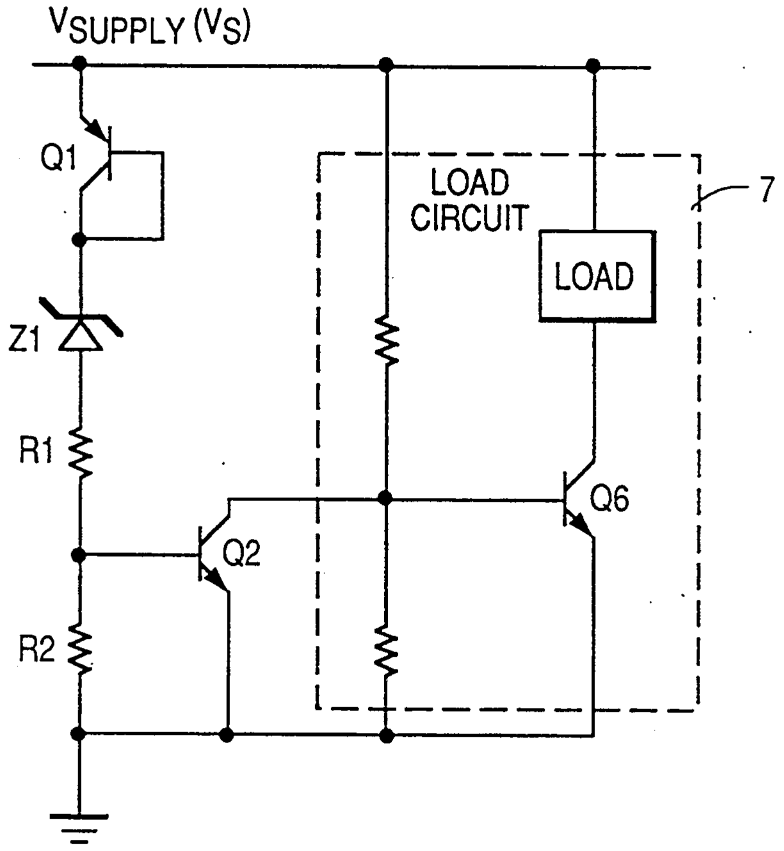
FIG. 1 PRIOR ART
FIG. 1 is a schematic diagram of a prior art circuit.
Figure 2:
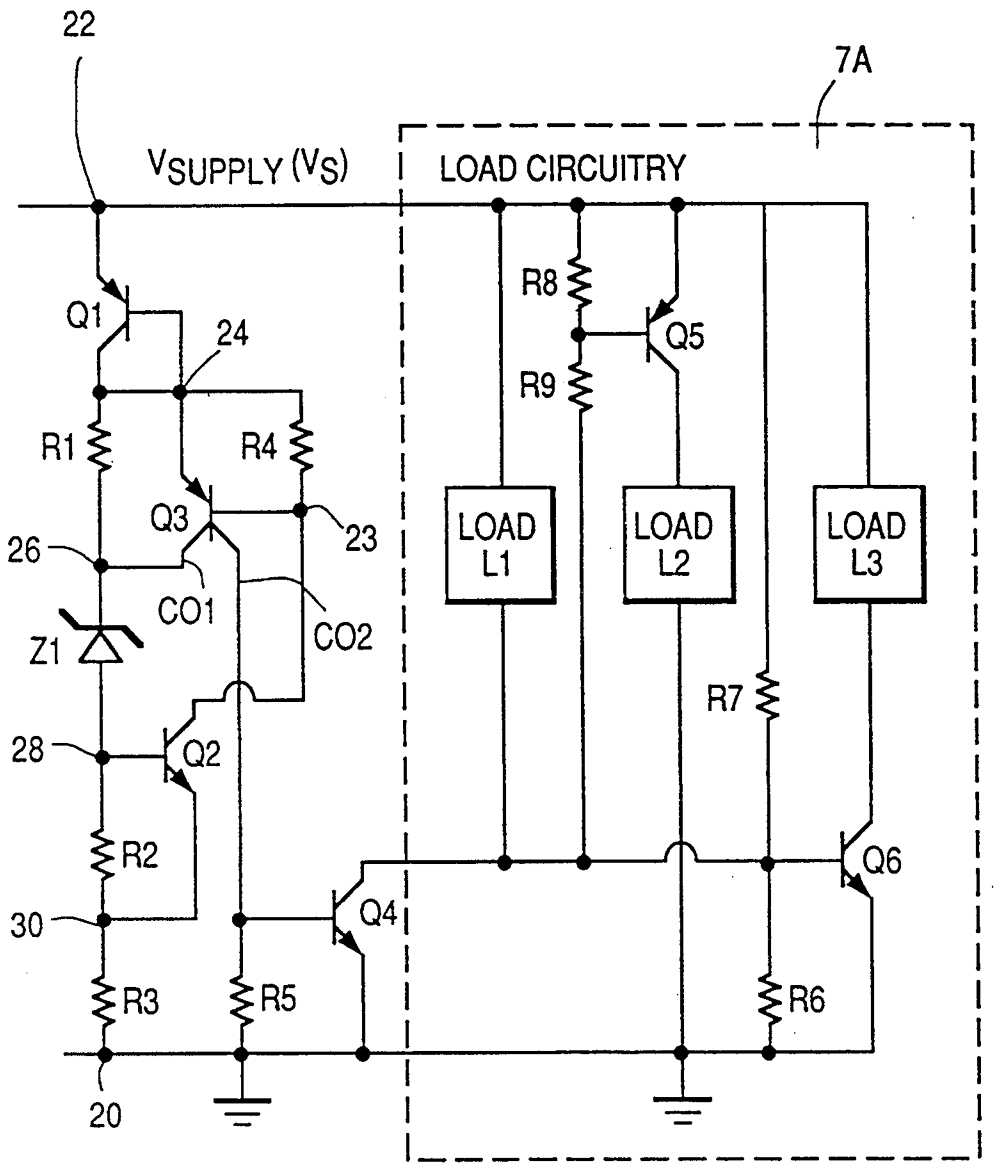
FIG. 2 is a schematic diagram of a circuit with hysteresis embodying the invention.

The circuit of FIG. 2 includes a first power terminal 20 to which is applied ground potential and a second power terminal 22 to which is applied the supply voltage, Vs. A PNP transistor, Q1, is connected at its emitter to terminal 22 and at its base and collector to Node 24. Q1 functions to block reverse current when the positive supply and ground connections are interchanged. A resistor R1 is connected between nodes 24 and 26. A Zener diode, Z1, is connected at its cathode to node 26 and at its anode to node 28. A resistor R2 is connected between nodes 28 and 30. An NPN transistor, Q2, is connected at its base to node 28, at its emitter to node 30 and at its collector to a node 23 to which is connected the base of a PNP transistor, Q3. Q2 functions to sense the current level through R2 and draws collector current when the voltage across its base and emitter exceeds a voltage defined as VBE2. A resistor, R3, connected between node 30 and ground terminal 20, functions to limit the current that can flow between Vs and ground via Q1, R1, Z1, R2 and Q2.

The emitter of PNP transistor, Q3, is connected to node 24, one of its collectors (CO1) is connected to node 26 and its other collector (CO2) is connected to the base of NPN transistor, Q4. The connection of CO1 of Q3, via Z1, to the base of Q2 and the connection of the collector of Q2 to the base of Q3 forms a latch circuit which functions like a silicon controlled rectifier (SCR) when Q2 goes into conduction. A resistor R4 is connected between the emitter and the base of Q3 to ensure that Q3 is turned off in the presence of leakage current through Q2 and/or Q3. The emitter of Q4 is returned to ground potential. A resistor, R5, connected between the base and emitter of Q4, ensures that Q4 remains cut off in the presence of leakage current through Q2 and Q3. Q4 functions to amplify the control signal produced by Q3 at CO2 and couples the amplified signal to the load circuitry 7A connected to its collector. The load circuitry may take many different forms. For purpose of illustration, three types of loads are shown connected to the collector of Q4. These loads may in fact comprise many other elements or portions of integrated circuits.

A load, L1, is connected between terminal 22 and the collector of Q4. When Q4 is turned on, current can flow between VS and ground via load L1 and the collector-to-emitter path of Q4. When Q4 is turned off, current can not flow through L1 and load L1 floats at a potential equal to or close to the supply voltage. The collector of Q4 is also connected via a resistor R9 to the base of a PNP transistor, Q5, whose emitter is connected to terminal 22 with a resistor R8 being connected between the base and emitter of Q5 to ensure its nonconduction in the presence of leakage currents. A load L2 is connected between the collector of Q5 and ground potential. When Q4 is turned on, it causes the turn-on of Q5 which provides a current path between Vs and load L2. When Q4 is turned off, Q5 is also turned off and the current path between Vs and load L2 is removed. The collector of Q4 may also be connected to the base of an NPN transistor such as Q6 whereby when Q4 is turned-on, Q6 is turned-off and the load circuit L3 in the collector of Q6 is disconnected from ground and hence, deactivated.

CIRCUIT OPERATION

In the description to follow, the overvoltage condition, VOV, is defined as the voltage condition for which Q2 is rendered conductive. This occurs when the current through R2 results in a voltage which exceeds the VBE of Q2 and causes Q2 to conduct.

When the supply voltage level, Vs, is much less than VOV, no substantial current, except for leakage, flows via Q1, R1, Z1, R2 and R3 to ground. The resistor, R2, is chosen such that normally expected values of leakage current through Z1 will not create a voltage across the base-emitter junction of Q2 which is large enough to cause Q2 to enter the forward active region of operation. Therefore, when Vs is less than VOV, Q2 is in the cutoff region. Likewise, the values of R4 and R5 are chosen to ensure that Q3 and Q4, respectively, are in the cutoff region under this condition.

When the supply voltage level, Vs, is increased to a value which exceeds the sum of the Zener breakdown voltage, Vz, of Z1 and the forward voltage, Vf, of Q1, a current Ix flows via Q1, R1, Z1, R2 and R3 to ground. When Vs reaches VOV, the current Ix is of sufficient magnitude to cause the voltage drop across R2 to forward bias the base-emitter junction of Q2 sufficiently to place it in the forward active region. The resulting increase in the collector current of Q2 causes a voltage drop to be developed across R4 with a polarity which forward biases the base-emitter junction of Q3. When the voltage applied to Q3 exceeds VBE3, Q3 begins to conduct. It then supplies additional current via CO1 into node 26 which then flows through Z1 and into the parallel combination of R2 and the base of Q2. As the voltage drop across R2 increases, more current flows into the base of Q2, causing the conduction level of Q2 to increase. The increase in the collector current of Q2 causes an increase in the base current of Q3, causing Q3 to conduct more heavily and supplying more current into the base of Q2. Clearly, the current which flows from collector CO1 of Q3 which is connected to Z1, flows via Z1 into the base of Q2 providing positive feedback to make the loop formed by Z1, Q2 and Q3 regenerative. The positive feedback continues until Q2 and Q3 latch up similar to a silicon controlled rectifier(SCR).

When regeneration occurs, the conduction level of Q3 increases quickly and dramatically. The collector current of Q3, which is supplied via collector CO2 to R5, causes an increase in the voltage across the base-emitter junction of Q4 which is sufficient to cause Q4 to enter the forward active region. The conduction level of Q4 changes rapidly when regeneration occurs going quickly from a fully-off to a fully-on condition. Even though the increase in Vs may be gradual, once the regenerative loop of Q2 and Q3 is energized, the turn-on of Q4 will be rapid and Q4 will switch the load circuitry 7A connected to its collector in an equally rapid fashion.

In addition to functioning as part of a latch, Q3, as connected, also functions to provide hysteresis to the circuit. As Q3 conducts more and more, the collector CO1 of Q3 goes into saturation and the voltage drop across R1 is decreased causing an effective increase in the voltage across, and the currents drawn by, Z1, R2, R3 and Q2.

Just prior to the onset of regeneration, when Vs is less than VOV, the voltage drop across R2 is just less than VBE2. Since the currents flowing in R2 and R1 are approximately equal (neglecting base current in Q2) the voltage drop across R1 is equal to $$VR1 \approx [R1/R2](VBE2)$$

When regeneration occurs, transistor Q3 is driven into saturation causing the voltage drop across R1 to be equal to $V_{CESAT}$(Q3). The change in the voltage across R1 from just before to just after the onset of regeneration may be defined as $V_{HYST}$, where, $$V_{HYST} \approx \{[R1/R2](VBE2)\} - VCESAT(Q3)$$

The resulting decrease in voltage across R1 increases the voltage applied to the series circuit formed by Z1, R2 in parallel with the base-emitter junction of Q2, and R3. This results in an increase in the current passing through each of the elements. Because of the saturation of Q3 involving collector CO1, the supply voltage must be reduced below VOV before the voltage applied to the base-emitter junction of Q2 is reduced to less than VBE2. Let the supply voltage which must be applied for the voltage drop across R2 to be equal to VBE2 after regeneration has occurred, be VON, where $$VON = VOV - V_{HYST}$$

When the supply voltage equals VON, conduction through Q2 and Q3 is substantially decreased. The collector current of Q3 which is supplied to the junction 26 of R1 and Z1 can no longer supply enough current for regeneration to continue. Therefore, Q3 returns to the cutoff mode and the voltage drop across R1 increases by an amount equal to $V_{HYST}$. When Q3 enters the cutoff region of operation, the voltage drop across R5 decreases below that required for Q4 to remain in the active region. Therefore, Q4 enters the cutoff region and the circuitry which it controls is allowed to return to the normal operation conditions which existed prior to Vs increasing to VOV.

Because of the regenerative nature of this circuit, the turn-on and turn-off characteristics of Q4 are sharp with respect to the supply voltage, not gradual as in the prior art. Also, by appropriate choice of values for $V_{HYST}$, oscillations are eliminated when the supply voltage is near VOV.

As described above, circuits embodying the invention enjoy one or more of the following features:

1. Overvoltage shutdown with hysteresis provides operation without oscillation due to noise near the control voltage.

2. Hysteresis provided by regenerative action which changes the operating point of the circuit.

3. Hysteresis provided by regenerative action which is activated primarily by a Zener or other reference diode(s).

4. The circuit draws only leakage current when the supply voltage is lower than the predetermined control voltage.

5. The circuit does not allow current flow when reverse biased.

In the circuit of FIG. 2, the reference setting element is a Zener diode. However, it should be evident that the Zener could be replaced by a number of forward biased diodes or by a circuit having a Zener-diode like characteristic.

It should also be evident that other types of transistors and other arrangements of complementary transistors may be used to practice the invention.

WHAT IS CLAIMED IS:

1. The combination comprising:

first and second resistors connected in series with a Zener diode between first and second points of operating potential;

first and second transistors, each transistor having an emitter and a collector defining the ends of a main conduction path and a base for controlling the conductivity of the main conduction path, and each transistor being responsive to a potential applied between the base and the emitter to produce a signal at its collector electrode;

means connecting the base-to-emitter of the first transistor across said first resistor for sensing the current through said series combination of said first and second resistors and said Zener diode; and means connecting the conduction path of said second transistor across said second resistor and means connecting the base of said second transistor to the collector of said first transistor for turning on said second transistor and reducing the voltage drop across said second resistor when said first transistor is turned on.

2. The combination as claimed in claim 1, wherein the turn-on of said second transistor causes additional current to flow through the Zener diode and the first resistor.

3. The combination as claimed in claim 1, wherein the first transistor is of one conductivity type and the second transistor is of second conductivity type , and wherein when said first and second transistors are rendered conducting, regenerative feedback causes them to go into a latch condition.

4. The combination as claimed in claim 3, wherein said second transistor includes two collector electrodes , one collector electrode being coupled to the base of said first transistor and the other collector electrode being coupled to the base of a third transistor.

5. The combination as claimed in claim 4, wherein said third transistor includes an emitter connected to one of said first and second points of operating potential and a collector coupled to load circuitry for controlling the conductivity of said load circuitry.

6. The combination comprising:

first and second points of operating potential;

first and second resistors and a reference element;

means connecting said first and second resistors and said reference element in series between first and second points of operating potential;

first and second transistors, each transistor having an emitter and a collector defining the ends of a main conduction path and a base for controlling the conductivity of the main conduction path, and each transistor being responsive to a potential applied between the base and the emitter to produce a signal at its collector electrode;

means connecting the base-to-emitter of the first transistor across said first resistor for sensing the current through said series combination of said first and second resistors and said reference element; and means connecting the conduction path of said second transistor across said second resistor and means connecting the base of said second transistor to the collector of said first transistor for turning on said second transistor and reducing the voltage drop across said second resistor when said first transistor is turned on.

7. The combination as claimed in claim 6, wherein said reference element is a Zener diode.

8. The combination as claimed in claim 7, wherein said first transistor is of NPN conductivity type and said second transistor is of PNP conductivity type.

9. An overvoltage sensing circuit comprising:

first and second nodes at which first and second voltages are provided;

a first current flow circuit path formed of a first resistor, a second resistor and a voltage reference circuit element coupled in series between said first and second nodes;

a first bipolar transistor having a base, an emitter and a collector, the base and emitter of said first bipolar transistor being connected across said first resistor, whereby said first bipolar transistor is operative to sense current flow through said first current flow path, so that in response to current flow through said first resistor forward biasing the base-emitter of said first bipolar transistor, said first bipolar transistor is rendered conductive causing current flow in the collector of said first bipolar transistor;

a second bipolar transistor having a base, an emitter and a collector, said second bipolar transistor having its collector-emitter current flow path connected across said second resistor, and wherein the base of said second transistor is connected to the collector of said first transistor, so that current flow in the collector of said first bipolar transistor is operative to turn on said second transistor and reduce the voltage drop across said first resistor.

10. An overvoltage sensing circuit according to claim 9, further including a third resistor connected in circuit across the base and emitter of said second bipolar transistor, and wherein said voltage reference element comprises a Zener diode.

11. An overvoltage sensing circuit according to claim 9, further including a controllable switching element arranged to be coupled in with a load and having a control input coupled to said second bipolar transistor.

12. An overvoltage sensing circuit according to claim 11, wherein said second transistor has a further collector coupled to the control input of said controllable switching element.

13. An overvoltage sensing circuit according to claim 12, wherein said controllable switching element comprises a third bipolar transistor having a base, collector and emitter, and wherein said third transistor has its collector—emitter current flow path couple in circuit with said load, and its base coupled to said further collector of said second transistor.

14. An overvoltage sensing circuit according to claim 13, further including a third resistor connected in circuit across the base and emitter of said second bipolar transistor, and wherein said voltage reference element comprises a Zener diode.

15. An overvoltage sensing circuit according to claim 9, wherein said first and second bipolar transistors are of complementary polarity types.

16. An overvoltage sensing circuit comprising:

first and second nodes at which first and second voltages are provided;

a first current flow circuit path formed of a first resistor, a second resistor and a Zener diode coupled in series between said first and second nodes;

a first bipolar transistor having a base, an emitter and a collector, the base and emitter of said first bipolar transistor being connected across said first resistor, whereby said first bipolar transistor is operative to sense current flow through said first current flow path, so that in response to current flow through said first resistor forward biasing the base-emitter of said first bipolar transistor, said first bipolar transistor is rendered conductive causing current flow in the collector of said first bipolar transistor;

a second bipolar transistor having a base, an emitter, a first collector and a second collector, said second bipolar transistor having its first collector—emitter current flow path connected across said second resistor; and a third resistor connected in circuit across the base and emitter of said second bipolar transistor; and wherein the base of said second transistor is connected to the collector of said first transistor, so that current flow in the collector of said first bipolar transistor flows through said third resistor and applies a forward bias across the base and emitter of said second transistor, so as to turn on said second transistor and reduce the voltage drop across said first resistor.

17. An overvoltage sensing circuit according to claim 16, further including a controllable switching element comprising a third bipolar transistor having a base, collector and emitter, and wherein said third transistor has its collector—emitter current flow path coupled in circuit with a load, and its base coupled to said second collector of said second transistor.

18. An overvoltage sensing circuit according to claim 17, wherein said first and second bipolar transistors are of complementary polarity types.

* * * * *